United States Patent
Chu-Carroll et al.

(10) Patent No.: US 7,778,964 B2
(45) Date of Patent: Aug. 17, 2010

(54) SYSTEM AND METHOD FOR PROVIDING POST HOC ACCESS TO LEGACY APPLICATIONS AND DATA

(75) Inventors: Mark C. Chu-Carroll, Dobbs Ferry, NY (US); Michael Karasick, Pound Ridge, NY (US); Samuel M. Weber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/342,767

(22) Filed: Jan. 30, 2006

(65) Prior Publication Data

US 2006/0200488 A1    Sep. 7, 2006

(51) Int. Cl.
*G06F 7/00* (2006.01)

(52) U.S. Cl. ....................................... 707/610
(58) Field of Classification Search ................... 707/610
See application file for complete search history.

(56) References Cited

U.S. PATENT DOCUMENTS

| 6,055,538 A * | 4/2000 | Kessenich et al. ........... 707/101 |
| 6,654,726 B1 * | 11/2003 | Hanzek ....................... 705/26 |

* cited by examiner

*Primary Examiner*—Charles Rones
*Assistant Examiner*—Belix M Ortiz
(74) *Attorney, Agent, or Firm*—Kenneth R. Corsello; Anne Vachon Dougherty

(57) ABSTRACT

A method and architecture having components for performing a method comprising the steps of: forming a simple bi-directional communication link between each of the clients and a server; and, transmitting along the communication link at least one of two kinds of messages comprising a first message which is a synchronous query/response, and a second message which is an asynchronous subscription based event notification, to allow arbitrary data structures to be rendered into a standard communication format.

10 Claims, 4 Drawing Sheets

SYSTEM AND METHOD FOR PROVIDING POST HOC ACCESS TO LEGACY APPLICATIONS AND DATA

FIELD OF THE INVENTION

The present application relates to the field of computer network data. It is more particularly directed to data structure and type, and interactive applications and data.

BACKGROUND OF THE INVENTION

The challenge to accessing legacy systems from client locations has been widely recognized, and numerous methodologies have been proposed to provide solutions. Conventional approaches to converting applications for distributed execution center on three main methods: distributed objects/ORBs, event buses, and browser based architectures.

In the distributed object approach, the server data structures that need to be accessed by the client are exposed to an Object Request Broker (ORB). The ORB allows remote processes to access exported objects through proxy objects, which transparently convert invocations of methods into remote procedure calls. Using an ORB based approach has two significant drawbacks:

1. The ORB requires that programmers follow a set of language bindings which dictate the structure and implementation style of code that will be interfaced to the ORB. This structure is never what programmers would have devised on their own. Creating a mapping between an existing data structure and the ORB based objects is an extremely complex process.

2. ORB based distribution translates each method invocation into a series of communications. The simple mapping of a data structure to an ORB-like approach results in large numbers of remote invocations, each of which is expanded into a series of separate communication events. To reduce this communication requires implementing a new layer of server objects which is interposed between the client and the server. Such an intermediate layer reduces bandwidth requirements by providing more coarse-grained operations that return data structures using awkward "by-value" objects. Each invocation still requires multiple communication events because of the complexity of the ORB communication protocols, and programmers are forced to use this awkward CORBA data types for values and proxies.

Browser-based applications are implemented as components that can be embedded within a web browser. These applications communicate with the server through the use of HTTP-family protocols. This approach can be very useful for relatively simple applications, but building complex interactive applications in such a manner is extremely difficult. HTTP is a client-driven, stateless, connectionless protocol, which makes interactive style communication difficult. While it is possible to implement applications in this fashion, they ultimately devolve to an unpleasant combination of HTTP based communication, and ad-hoc TCP/IP connections for necessary communications that are inexpressible in HTTP.

More specifically, inside IBM computing environments, the Component Broker (CB) system and the Enterprise Java Beans (EJBs) approach each provide a rich interface to allow client programs to access legacy systems on servers. However, it is desirable to provide a simple, lightweight, low-technology system that focuses on data access, without requiring the more complex features of larger systems, and for quickly implementing the data-access layer of more complex, full-featured systems like EJBs or CB components.

Alternatively, Microsoft has proposed two strategies towards solving this problem: Active Data Objects (ADOs), and Common Object Model (COM) wrappers. Active Data Objects are similar in design to Enterprise Java Beans and Component broker, providing rich interfaces to legacy databases on server platforms. COM wrappering is a technology for accessing legacy code. It consists of implementing stub code in Microsoft's Common Object Model to allow clients to access the code and/or data in a legacy system through the standard Microsoft object model. One drawback to the Microsoft approach is that it relies on the Microsoft COM infrastructure, such that systems that use this approach must adopt the Microsoft system architecture. In addition, the COM infrastructure is a complex system, which adds significant complexity to systems that use it.

With regard to heterogeneous linked data structures which may reside at client and server locations, there is also a need to provide access and coherence between two distinct data structures that represent the same underlying data which exist in distinct memory spaces on two different computers. Since two such data structures are supposed to represent the same underlying data, any change in one of the data structures needs to be reflected in the other. One key point about this is that while the two structures represent the same underlying data, their actual structure in the memory of the computer need not be identical.

Under the presently available technology, the two isolated data structures can be handled using a technology called distributed shared memory (DSM). DSM, however, has a lot of requirements including:

1. requiring operating system support
2. requiring very high speed, high bandwidth network access
3. requiring laborious programming using special libraries.

What is desired is a system and method which allows programmers to implement linked data structures manually, using a reasonably easy mechanism which requires no special support from the operating system and which only requires a low-speed low-bandwidth network connection.

What is desirable, therefore, and what is an object of the present invention, is to provide a lightweight solution which relies on a very small, low-tech infrastructure to facilitate communications and access among distinct computing entities.

Another object of the invention is to provide a lightweight method and system which will facilitate implementing ADOs and COM wrappers for legacy systems.

Yet another object of the present invention is to provide a system and method for providing post hoc access to legacy applications and data.

Still another object is to provide a method and apparatus which allows interactive applications to be implemented across the Internet.

Another object of the invention is to provide a method and apparatus for programmers to build high performance distributed applications with low bandwidth requirements.

Yet another object of the present invention is to provide a method for building clients that can access legacy systems.

SUMMARY OF THE INVENTION

The foregoing and other objects are realized by the present method and architecture having components for performing a method comprising the steps of: forming a simple bi-directional communication link between each of the clients and a server; and, transmitting along the communication link at least one of two kinds of messages comprising a first message which is a synchronous query/response, and a second message which is an asynchronous subscription based event notification, to allow arbitrary data structures to be rendered into a standard communication format.

In alternative embodiments, the method further comprises employing synchronous event notification based on a subscription based communication model. The method may be employed whether it is the client initiating an event or whether the server is initiating an event. An event may include an event type and optionally event-specific information describing the event. In addition, components on the server may register listeners to receive notifications of particular event types and/or components on the client may register listeners to receive notifications of particular event types. Other aspects of the invention include building an application that accesses legacy systems and data using the foregoing communication model; adding low-tech "extensions" to additionally provide services via the communications model; and/or providing access both to legacy data and to legacy code.

BRIEF DESCRIPTION OF THE DRAWINGS

The invention will now be described in greater detail with specific reference to the appended figures wherein.

DETAILED DESCRIPTION OF THE INVENTION

The invention includes a simple, architecture neutral system for building clients that access legacy systems. The invention consists of two parts: a data/computation model which allows the implementation of a uniform, extensible query system, and a communication model which allows arbitrary data structures to be rendered into a standard communication format.

Figure 1:
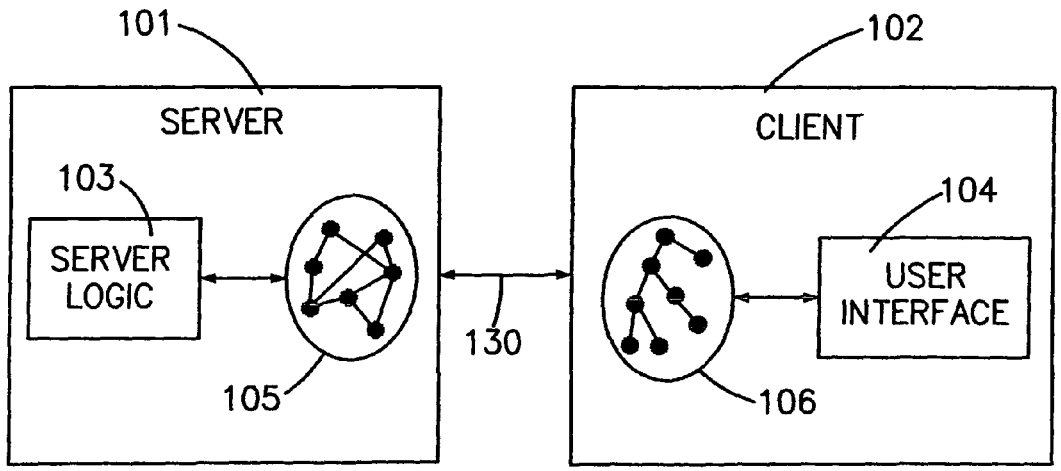
FIG. 1 shows a system architecture for use with the present invention.

While the invention is "architecture-neutral", it will be described with reference to the client/server system architecture depicted in FIGS. 1 and 2 wherein replicated data structures are located at the server and the client. The FIG. 1 illustration represents a heterogeneous replicated data structure which comprises a plurality of data structures located in different address space (i.e., at server 101 and at client 102), possibly on different physical computers, which data structures represent the same underlying data using potentially different representations. When one of the replicated structures is altered, that alteration must be reflected in the other replicas within a finite, bounded time. The structures are heterogeneous because the replication mechanism does not require that the same representation be used in all replicas. The replicas share a common store of data, but not necessarily a common representation.

As shown in FIG. 1, the server application at server 101 includes server logic 103 to operate on the data in server data structure 105. On the client side, the client application at client 102 responds to user input at user interface (UI) 104 to operate on the data in client data structure 106. The underlying data in data structures 105 and 106 is the same data.

For instance, the server replica may be a complete program representation of a project used for compilation, and the client replica may be a simplified representation optimized for program browsing. The two replicas reflect a common set of underlying data (the source code of the project being browsed and compiled) but the representations of that data differ according to the use each makes of it.

The illustrated architecture allows programmers to build replicated data structures for client/server applications. It is designed for the particular case of a client/server system wherein the server is a remote host which contains a master copy of a collection of data which will be shared with clients. For a given subset of the server data, there is exactly one client which will be accessing that data, that client being a local workstation which is used to browse and/or manipulate the data. Generally, the server copy of the structure is treated as the canonical copy of the data such that changes are not treated as permanent unless they are performed on the server. While the server may support multiple clients, each client operates on a distinct set of data which it shares with the server. The architecture is scalable for the multiple client case to allow applications to be used in a collaborative mode.

The data model of the present invention allows communications in the illustrated heterogeneous replicated data structure architecture and in other client/server architectures based on a simple model of key/value associations. Data objects in a legacy system (e.g., at server 102) are associated with unique IDs. A query includes a client requesting that the server provide information about a "property" of a server object which is identified by its ID. The requested property is identified by a name (e.g., the property "size", where the query "SIZE 01" is generated to obtain the size in bytes of the server object 01).

For each property which a client can request, the programmer provides a query handler extension which is capable of handling that query. A query handler extension is a simple program which is allowed to execute on the identified server object, producing a value which is then transmitted to the client using the communication system.

The communication model utilizes a simple bi-directional communication link, 130 of FIG. 1, between the client and the server. The communication link transmits two kinds of messages: synchronous query/response, and asynchronous subscription based event notification, defined as follows:

a synchronous query/response is used to submit queries from the client to the server. A client request includes an ID and a property. The communication system locates the object associated with the ID, and invokes the extension registered to handle queries for that property. The extension returns a structured text document (in a standard format such as XML) which is transmitted to the client as a response.

an asynchronous event notification is based on the subscription based communication model. Both the client and the server can initiate events. An event includes an event type, and a chunk of data which contains event-specific information describing the event. Components on both the server and the client can register listeners to receive notifications of particular event types.

The invention additionally provides an architecture and infrastructure for building applications that access legacy systems and data, to which simple low-tech "extensions" can be added to provide services. The advantages of the invention include the following:

It is a low-technology, architecture-neutral solution.

The "startup cost" of building legacy access systems using this technology is low, and systems can be built incrementally by adding small units, without increasing the overall complexity of the system.

The invention provides access both to legacy data, and to legacy code. Since significant value often exists in legacy code, this system can have great advantages over approaches that only preserve access to legacy data.

Figure 2:
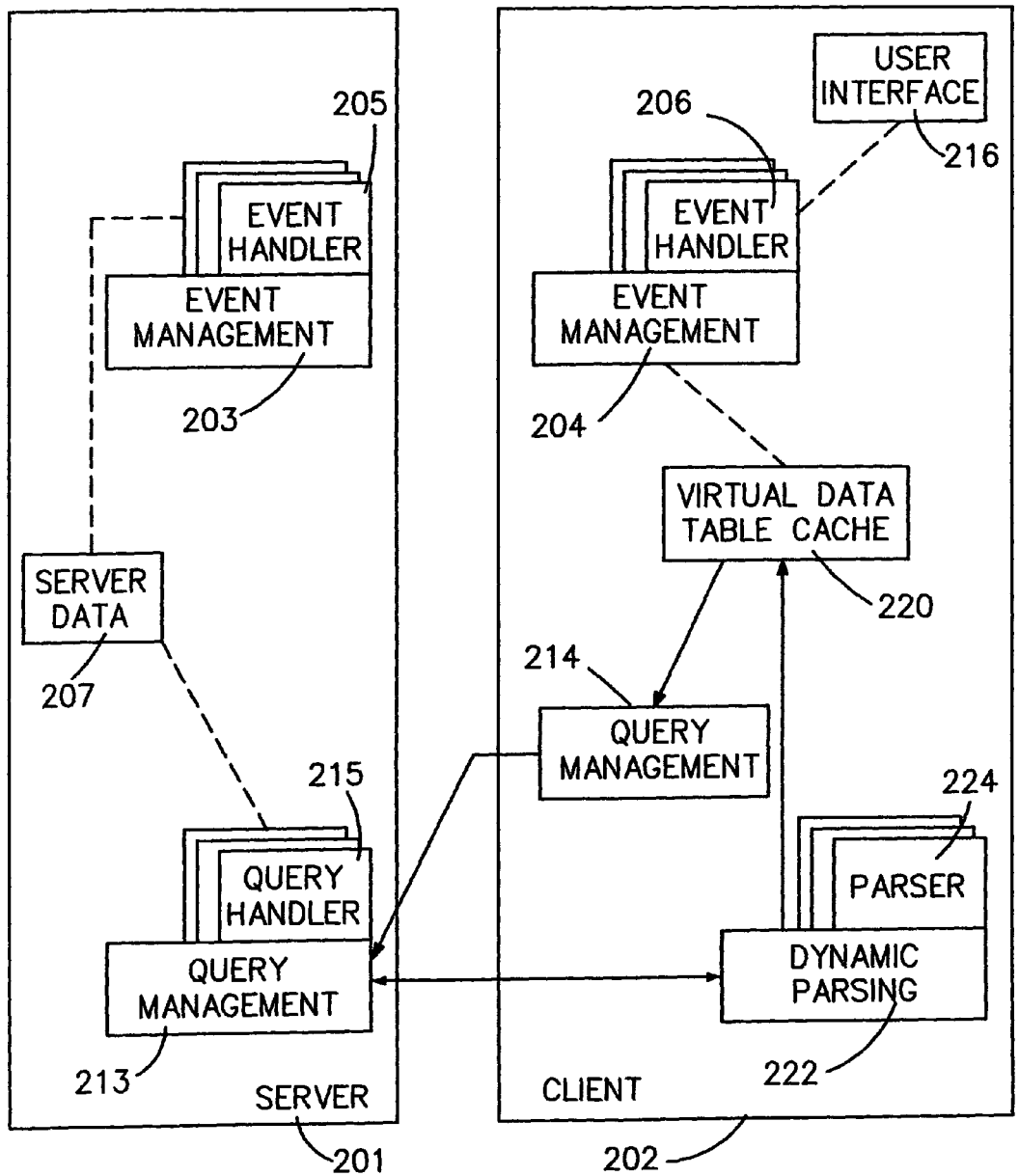
FIG. 2 shows a replicated data structure architecture in accordance with the present invention.

FIG. 2 illustrates the replicated data structure architecture of the present invention. The architecture uses standard mechanisms to build the replicated data structure infrastructure. The system is based on an OO database-like virtual table system, XML generation and parsing tools, and subscription based communication, all described further below. The inventive replicated data structure architecture uses two mechanisms to create and maintain replicated data structures: a query system, which is used to transfer data, and a subscription based communication style event system, which is used to perform update notifications. These two conceptual mechanisms are multiplexed onto a single, bi-directional, asynchronous communication channel using, for example, XML (16) as a transport format.

As shown in FIG. 2, the server 201 comprises an event management component 203 including at least one event handler 205 and a query management component 213 having at least one query handler 215. Server data 207 is accessible to both the event handlers 205 and the query handlers 215. On the client side, the client 202 includes a user interface (UI) 216, an event management component 204 having at least one event handler 206, and a query generation component 214. Both the event and query components access client data stored in the virtual table cache 220. In addition, the client includes a dynamic parsing component 222 which comprises at least one parser extension component 224.

The event system is a subscription based communication (also known as indirect invocation) style messaging service, which is used to send lightweight notifications to parties which have registered interest in the appropriate type of message. Parties register interest by providing small executable fragments (event handlers 205), which executable fragments will be invoked when a particular sort of event is generated. This event mechanism is used for two purposes: both the client and the server generate events to signal changes in some piece of shared data, and the client generates events to notify the server of UI actions performed by the user. For example, while editing a document in a distributed word processor, if the user clicks on the "save" button, the server should write the document to a disk file. The details of the event handling are further described below.

An implementation of the inventive architecture is based on a simple, reusable core, which provides the basic generic services needed to build applications based on replicated data structures. This core allows new systems to dynamically register extension components, which provide the services needed by a particular implementation. The core is easily implemented, and cores written in different programming languages interoperate transparently.

The query subsystem provides the basic functionality that allows a system to create and maintain a coherent replica of a server data structure. The query system is designed with two key ideas in mind: client transparency and pseudo-tabular queries. Client transparency allows the client-side user interface code to be written as if the data were in fact available locally, rather than being replicated from a remote host. The user interface code for the client can be written without explicit consideration of the complexities of distribution of communication: it simply accesses what appears to be local data, and the lower levels of the system transparently generate and handle the necessary communication. Pseudo-tabular queries allow programmers to use a simple query style which provides access to complex nontabular data in a manner which can be transparently translated into a query against the remote master copy of the data.

In the inventive system, the underlying data is divided into a collection of parts (referred to hereinafter as "chunks"), which much exist in some form in all copies of the data. Each of the chunks is assigned a unique identifier. The data has some chunk containing the root of the data structure, which is assigned a distinct ID. For the purposes of explanation, the distinct ID which is assigned will be "0". The IDs are used by both the query and event mechanisms to identify objects.

As used in the present application, an event is a simple message containing three fields: a target, which is an identifier of a particular chunk; an event type, which is a hierarchical identifier describing the type of event; and a simple piece of detail data, which describes the event.

With regard to the query system, the inventive concept is to impose a virtual table structure on non-tabular data. Each chunk of data is treated as a row in this virtual table, shown in virtual table cache 220 of FIG. 2. The columns each correspond to a piece of information contained in a chunk that would be needed to create or maintain a replica of the underlying data.

Pseudo-tabular queries are provided through the virtual table mechanism. This mechanism allows the client to obtain a replica of the server data using a simple tabular query. Server implementations select data which they wish to expose to the client, and associate those pieces of data with virtual table rows, through the use of a unique identifier. Each column in the virtual table is associated with a query handler extension, which computes the value of the column for an object, given its identifier. The resulting value is returned as, for example, an XML document. Clients request data from the server by requesting the value of a particular column of a particular virtual row. The resulting document is translated into a suitable data structure using client side dynamic parser extensions, detailed below.

In a tabular representation, all data is contained in rectangular tables, where each row of the table represents one object or record, and each column of the table represents one field of each record. Such representations are easy to access through queries, which request the value of a particular (row, column) entry in the table.

In many interactive applications, the data structures are not represented as rectangular tables, but instead consist of collections of data linked in complex fashions, forming trees or graphs. These complex data structures are difficult to access using queries.

Figure 3:
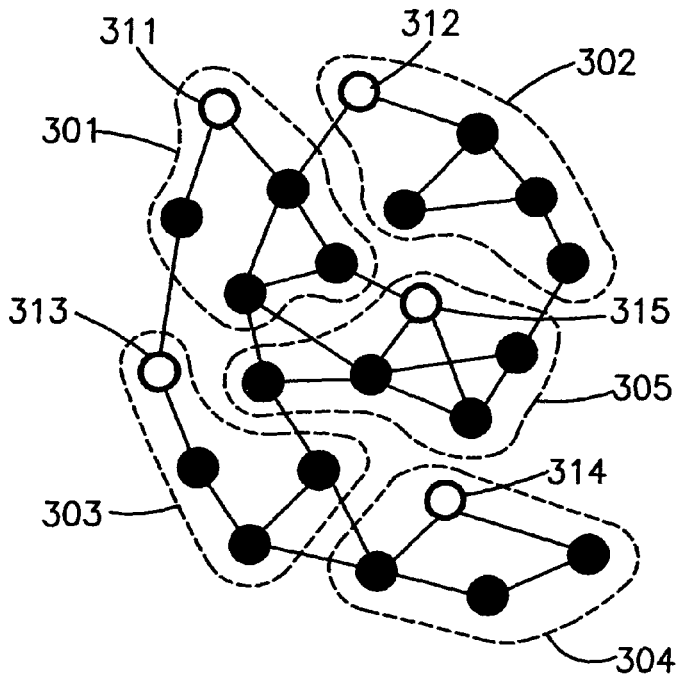
FIG. 3 schematically represents creation of a virtual table structure of non-tabular data in accordance with the present invention.

To allow simple access to the data, the present approach imposes a virtual table structure. To do this, the data structure is partitioned into sub-graphs as shown in FIG. 3 as 301-305, each of which is identified by one node, called the key node, 311-315. Each key node is assigned a unique identifier, which will be used as an index to identify its row in the virtual table. Each dotted line surrounds a subgraph that the programmer decided to treat as a table row. The transparent node in the subgraph is the key object, and the assigned identifier is shown inside the key node.

Once the data structure is partitioned, the programmer then chooses a set of queries that can be used to obtain information about the section of the data structure handled by each key object. The result of each of these queries will become a column in the virtual table. For each column in the virtual table, the programmer provides a query extension which will be used to compute the value of the column given the object associated with the row. This process forms the virtual table, which will be replicated on the client (see: 220 of FIG. 2) through the use of the query mechanism.

The columns of the table are computed dynamically. Initially, all of the fields of all of the table rows are empty. When the client application is started, it will start transmitting queries for the value of particular (row, column) locations in the virtual table. As each query is received, the value of the requested (row, column) table location is computed and cached in the virtual table before being transmitted to the client.

Figure 4:
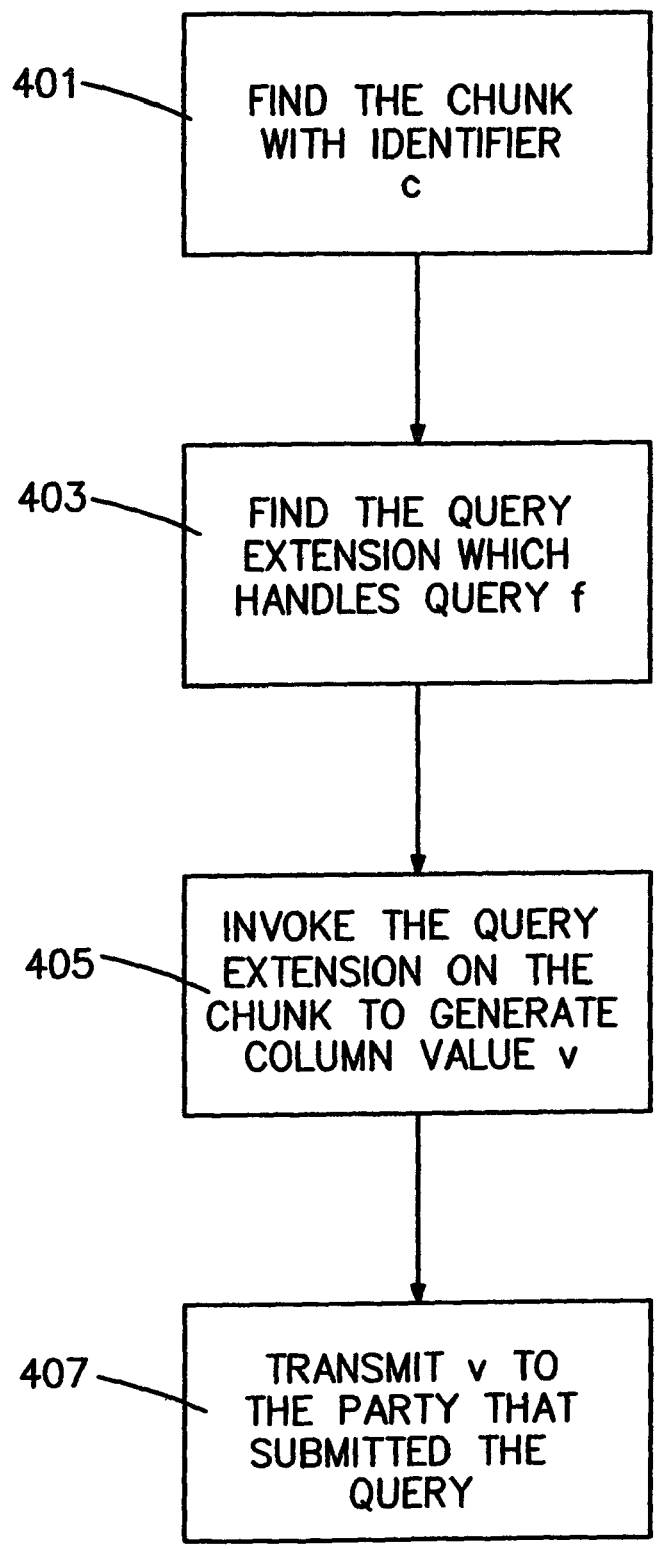
FIG. 4 provides a representative process flow for handling a query in accordance with the present invention.

A query Q<f,c> is a request for the value of a particular field f of a chunk with identifier c. To perform the query, the system does the following, as detailed in FIG. 4:

At step 401, find the chunk with identifier c.

At step 403, find the query extension which handles the query f.

At step 405, invoke the query extension on the chunk, generating a column value v.

At step 407, transmit v to the party that submitted the query.

What is particularly unique about the present query system, is that the column values are computed dynamically at step 405. By dynamic generation of the column values, the present invention is able to allow implementors to dynamically and incrementally add functionality to the system, without altering or affecting parts of the system that existed prior to their addition.

When the client issues a query, the query handler on the server generates the result value represented as, for the sake of example, an XML document: the client accesses server data using queries for the value of a (rowid, col) location in the virtual table. The server core invokes the query handler associated with col on the key object associated with the rowid. The resulting document is transmitted to the client, which parses the document, generating a new data structure containing the information extracted from the server query.

Figure 5:
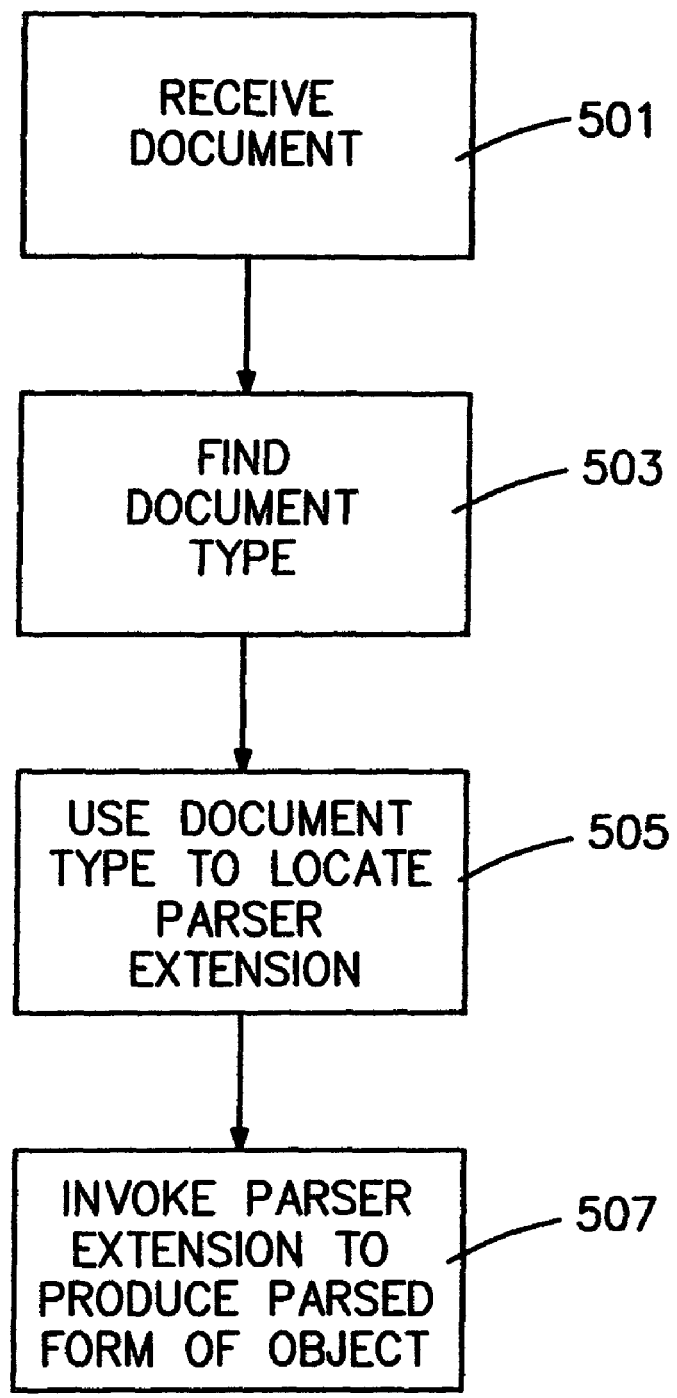
FIG. 5 provides a representative process flow for client parsing in accordance with the present invention.

What makes the foregoing possible is a dynamic parsing method whereby the system associates parser extensions with document types. A parser extension is a simple dynamically loadable component which can parse a document and return the parsed form. As depicted in FIG. 5, the system receives at 501 an incoming message which contains an XML document, of some unknown type. The system examines the document at 503 to find a marker which identifies the document type, and then uses this document type at 505 to locate the parser extension associated with the document type. Once the parser extension is located, the system invokes the extension at 507, which produces the parsed form of the object.

In the parsing process, the system must be able to identify the type of document using some mechanism based on the document representation. For example, if the document were encoded using XML, then the document type could be identified using the embedded DTD declarations. DTD declarations are an embedded tagged form which identifies the document type. The DTD declaration item is marked distinctively, and comes within the first few lines of the document. The DTD declaration contains an identifier which can be used to determine the document type. The DTD specification identifies another document which contains a complete declaration of the document type. The DTD uniquely identifies the type of a given document. In addition to identifying the document type, the DTD specification will be used by a validating parser to ensure that the document conforms to the DTD before passing it to the parser. In the XML example, XML Schemas are a new alternative to DTDs which specify XML document types in a manner better suited to automatically generated XML documents encoding data structures. Like DTDs, a validating parser will verify that a document conforms to its declared schema. The use of DTDs or schemas ensures that the client does not need to perform any error-checking while processing the XML document.

In cases where the cost of document validation is too high, programmers can opt to omit the DTD declaration. In this case, we take advantage of the fact that every well structured XML document contains a single top-level tag in which the entire document is nested. If XML namespaces are used, this top-level tag is unique for each document type. Thus, this top-level tag can be used as a document type identifier.

The choice between these two alternatives is based on the needs of the particular application. If the programmer expects new components to be frequently integrated into the system, the DTD/Schema based mechanism is preferable, because it will detect any errors in the structure of documents generated by new components. However, if the system is expected to consist mainly of a fixed set of well-tested components, and the performance cost of validating all documents is too high, then the top-tag mechanism would be preferable.

The present invention presents methods and apparatus for dynamically typed XML-RPC and for heterogeneous linked data structures. With regard to dynamically typed XML-RPC, it is noted that XML-RPC is an RPC method that uses textual documents to represent data passed in the RPC. Each piece of data is represented using an XML document. In conventional XML-RPC methods, the document type of each item in a given RPC is fixed. Conventionally, it is not possible to change or extend the types of data that can be passed in an RPC without making significant and difficult changes to the system. In particular, such changes cannot be done dynamically to a running system. While the foregoing is true of XML, it is not true only of XML and will apply to any mark-up language wherein the underlying data representation is based on an extensible tag-language. (A tag language is a text-based representation in which the structure of the document is marked up by some form of embedded commands called tags. Examples of tag languages other than XML include SGML and Lisp S-expressions.) As long as the underlying representation is a suitable tag-language, this inventive technique will work.

The present invention comprises in part a procedure that allows programmers to use dynamic typing in XML-RPC which gives an RPC system in which the data type of a parameter is unfixed, allowing any desired type to be passed. In particular, the set of document types that can be passed is extensible while the system is running, without changing any existing part of the system.

On the client side of the system, the present architecture abstracts away the details of the communication layer, thereby presenting the illusion that the entire virtual table is available locally. The client contains a data cache which stores fetched cells from the virtual table. When the client tries to access a cell which has not been cached, a query is automatically generated, and the requesting thread is blocked until the data becomes available. If the cell has already been fetched in the past, the value is retrieved from the cache.

The event mechanism of the present invention is used to ensure that the entries in the cache are always up to date. When a cell is changed by the client, it uses the event mechanism to send updates to the server; when a cell is changed by the server, it uses the event mechanism to invalidate the cache entry in the client so that it will be refetched next time it gets used.

The transparent query service means that any data which is not currently residing in the client table (and thus the client replica) can be considered to be coherent with the server copy. If the field is ever accessed, it will be refetched by the client from the server, and thus any client access to the data will reflect the correct value. Thus, when a state change on the server causes an entry in the client table to be inconsistent with the server, the server does not need to immediately update the client-side value—it only needs to send an invalidation event, to cause the inconsistent client side value to be removed.

The operation of the system can be divided into three different parts:

1. Initialization: the data starts on one system, and needs to be transferred to another system to form the initial replica.

2. Change notification. When a change occurs in one replica, its counterpart needs to be notified that a change occurred, so that it can perform a matching change.

3. Update. When a replica has been notified that something changed, it may need to obtain some data detailing the change.

Initialization of a replica is performed using the query system. The system submits a collection of queries that obtain the data needed to create a replica, with the exact set of queries being dependent on the particular application. Once the replica is created, the system goes into the normal operational phase. During this phase, applications use the replicas to perform some sort of computation using the data. When one of these applications performs a change on the replica, the replica generates an event notification, which is transmitted to the other replica to describe the change.

The event system is used to send change notifications between the replicas. The detail information generally doesn't describe an entire change, but provides the identifier of a chunk containing detailed information describing the change. For each family of event types, a replica can provide a set of event handler extensions, which are software components that know how to respond to a particular kind of change. An event handler may generate both queries, and further events.

When a change notification is received by the target replica, it locates the set of event handlers registered to handle this kind of event, and invokes them in sequence. These handlers generate queries for any data needed to perform a matching update, and then contain the event handler code which performs the necessary changes on the replica. In accordance with this technique, the programmer writes custom code for query handling, for event notification, and for event handling. The set of queries, and the set of events generated and handled, are custom matched to the linked data structures.

Events are lightweight, asynchronous messages which are handled on a subscription basis. Each event has an event type, which is a hierarchical identifier. Programmers can register event handler extensions, which are simple extensions invoked whenever a particular type of event is generated. An event handler is registered with an event type prefix, and will be invoked whenever any event whose type contains that prefix is generated. For example, if an event handler is registered for one event type "a.b", it will be invoked for events of type "a.b", "a.b.c", "a.b.d", "a.b.c.e", etc.

Each event contains information including a target, which is the identifier of an object associated with the event, and an optional XML document containing more detailed event information which is too complex to be placed into the detail string.

Events are generated by components of the client or server whenever they perform any operations that might be of interest to other components anywhere in the system. Event delivery is sufficiently inexpensive in terms of both computation and communication time that programmers can feel free to generate any event which they believe any other component might ever be interested in. The event mechanism is essentially an indirect invocation system: event generators do not need to know the identity of, or even the existence of interested listeners. They simply generate the notification, and any interest party will receive it. When an event is generated, all registered handlers will be notified, both locally, and in the counterpart. (So, for example, if the client generates an event, listeners to the appropriate event type on both the server and the client will be invoked.) In typical use, the event mechanism is used both for communication between client and server, and between separately implemented components of the client.

Complete events are presented in the form:

EVENT: type="type" target="id" detail="detail"

DOCUMENT
  Document-Contents

END

For simple events, where the detail document is empty, we will use the following, more compact form:

EVENT(TYPE="type" TARGET="target"
        DETAIL="detail")

For example, consider a programmer building an application that allowed remote editing of a "To Do" list. Each entry in the "To Do" list has a string, describing what the user is supposed to do, a priority, and a due date. The client in this application is a user interface allowing the user to view and manipulate the "To Do" list. There are several basic changes that the user could make to the "To Do" list data structure: adding an entry, removing an entry, ad changing some property of an entry. We will assume that each entry in the "To Do" list has a unique identifier, and the list itself has the id "0".

Removing an entry. When the user selects an entry to remove, it calls the "remove" method of the "To Do" list. The implementation of the remove method gets the id i of the to do entry and generates an event notification "EVENT(TYPE="ToDo.Delete" TARGET="i" DETAIL=" ")" The detail string and document are both left empty because no information is required beyond the event type and target.

Changing the priority of an entry. To change the priority of entry j to "high," the UI calls a method of the local "To Do" list structure. The change priority method of a to do list entry generates the event EVENT (TYPE="Todo.ChangePriority" TARGET="j" DETAIL="high"). The detail document is empty because all the detail information needed could be encoded into the detail string.

Adding an entry. To add an entry with text "Call Mom," high priority, and due date "Dec. 12, 2000" to the list, the UI inserts a new entry into the local replica. The replica needs to generate a "Event.Add" event. There is a bit of added complexity here: a new object is going to be added to the system, and the client and server need to agree on the ID of that object. Since in this application, new "To Dp" entries are only added by the client user interface, the local replica is allowed to generate a new ID "n" for the new entry. But because the new ID does not yet exist on the server, it cannot be the target of the event. The event is therefore generated with the target id "0", which is the ID of the "To Do" list, and the new ID assigned by the client is encoded into the event detail. In this case, the detail information is too complex to include in the simple detail string, so an XML document is used.

EVENT: type="Event.Add" target="0" detail=" "

DOCUMENT:
<ToDoEvent id="n" priority="high">
<date month="12" day="12" year="2---"/>
Call Mom
</ToDoEvent>
END To build a new distributed application based around a replicated data structure, a programmer needs to perform the following steps:

1. Implement Server-Side Query Support:
Implement a mapping of server objects to IDs, including a bookstrap object. The bootstrap object is an object whose ID both the client and the server know in advance. Such an object is needed to allow the client to issue its first query, which it will use to get information about other server objects. For example, in our distributed "To Do" list system, the bootstrap object would be the users "To Do" list itself, which contains all of the entries. By convention, the bootstrap object is given the id "0",
Implement a set of query handlers that expose properties of the server objects.

2. Implement client-side parsing support: for each XML document format used by the server-side query handlers, provide an XML document parser that can transform documents into client-side data objects.

3. Identify the set of state changes that will need to be signaled to keep the replicas of the shared data structure synchronized.

4. For each such state change, implement code to generate event notifications when such a change is performed, and implement event handler extensions to perform matching changes to the other replica. In an object-oriented program, this event signaling code is easily embedded into the methods of the data replicas which perform state changes.

An example of implementation of the present invention follows wherein a programming environment for C++ is provided. The data structure being replicated is a database containing the elements of a program written in C++. The chunks are the individual program elements. The chunk with ID 0 is the root of the data structure, which is a list containing all of the program elements contained in the database. The program where the original copy of the program store resides is referred to as the server, and the program where the replica resides is referred to as the client.

The replica is created by doing the following:

The client sends a query for the "declarations" property of ID "0" to the server. The server locates the query extension for the "declarations" property, invokes it on chunk "0". This generates an XML document containing a list of the declarations in the database. The list contains the name of each declaration, and its ID. The server then sends the result to the client.

For each declaration in that list, the client sends a query to the server for the "details" property of the declaration using it's ID, which was learned from the initial query. The server locates the chunk with the ID, invokes the "details" query extension on it, and sends the result to the client.

Once this is done, the system allows the programmer to view and manipulate the replica of the program store. Two kinds of changes can then be made. One change is called incorporation, which recompiles the entire program, and may change any arbitrary set of declarations. The other change is addition, where the programmer adds a new program element to the system.

For the addition process, the user signals an incorporation by clicking a button in the UI. The incorporation process can only be performed by the server, so the client sends an event to the server notifying it that a reincorporation has been requested. This is done with an event of type "Project.Incorporate", with target "0", and no detail data.

The server has an event handler extension registered to listen to all Project events. It looks at the event type, sees that it's an incorporation event, and performs the incorporation. During the incorporation, it keeps track of the set of declarations that were changed by the incorporation. When it's done, it creates a new chunk containing this information, and assigns it an ID I. It then sends an event to the client notifying it of the changes. The type of this event is "Project.Incorporation.Completed", with target "0", and with a detail string containing the ID I.

The client then sends a query for the "Details" property of the chunk with ID I. This returns an XML document containing the IDs of the altered declarations. The client then sends a sequence of queries to retrieve the updated details of each of these changed declarations.

The architecture provides a set of flexible mechanisms that programmers can use to build systems where coherence is maintained. This allows programmers the flexibility to design the communication mechanisms in a manner which is suited to the application. With such a programmer-controlled mechanism, programmers can decide what data to replicate, when to replicate it, what structure should be used to represent the replica, and how and when to maintain the coherence of the replicas in a manner which will not interfere with the performance of the client. Leaving control over data coherence in the hands of programmers allows them to take advantage of their knowledge of the problem domain and the particular application in a manner that ensures the best possible performance of the distributed application. It has been found that tools which try to perform this task automatically can cause delays at crucial times causing poor performance and adversely affecting the usability of the application.

The architecture provides a weak consistency model. This consistency model requires that following invariants be followed. If the architectural invariants are obeyed, then it guarantees that at any point where the client replica receives the result of a query, the server and client replicas are fully consistent. The invariants are:

Client:
After any local state change in the client, events notifying the server of those changes must be transmitted to the server before the client performs any queries against the local datastore.
After a query has been issued, the client must delay any state changes until after the result of that query has been received
Server: After any state change in the server, the server must send update notifications to the client before it processes any queries.

These invariants are sufficient to guarantee the consistency condition.

Consider a state change in the server. As long as the change notification is received by the client before the results of any queries, the client will have matched the change before it processes the query result.

The client case is trickier. There are two real cases here: queries issued before state changes, and queries issues after state changes.

If the client issues any queries after a state change, then this case is similar to the server case. As long as the change notification sent to the server precedes the query, then when the query result is generated, the client and server states match.

If the client sends a query, and before the result is received, it performs some state change, then the query result received will reflect the state of the server before the state change was performed on the server. This will result in an inconsistent state: the results of the query will not reflect the state change. But if the client delays the state change until after the receipt of the query result, then the client and server will be in a consistent state; then the state change is performed on the client, and the change notification will be transmitted to the server before any more queries are issued.

Samples of the inventive architecture have been implemented in two complete server cores: one written in Java, and one written in C++. In addition one complete client core has been written in Java. The size of the C++ server core contains approximately 1200 lines of code, and the Java server core contains approximately 1000 lines of code. The Java client core consists of approximately 2000 lines of code. All of these pieces rely extensively on off-the-shelf components.

The cores have then been used to build a variety of tools. The C++ core has been used to implement a program browser for a C+ programming environment. This program browser uses a user interface written in Java, and interfaced to the Java client core. The Java server and client cores have also been used for implementing a cross-language bridge for a mixed Java/C++ program analysis tool.

An example application comprises a decoupled programming environment. The original motivation for the design of this architecture was to find a method for implementing programming environments for platforms such as IBM's System/390 where graphical displays are not available. While versions of X-windows are available for such machines, the bandwidth requirements of X are not suitable for operation over wide area networks common in enterprises that use mainframe platforms.

Starting with the core of VisualAge C++ v4.0, a highly flexible, extensible, incremental compiler and persistent program store for C++ is provided. On Windows and Unix, a tightly coupled programming environment is also realized. The task was to decouple the user interface in such a manner that performance of the local UI could be maintained, while being connected to a remote program store through a low-bandwidth communication link. In later iterations of the system, support for Java can be provided through a repository based on a Java class file reader.

The VisualAge C++ kernel which is used by the kernel contains approximately 500,000 lines of code, including the entire C++ compiler. To expose the necessary data structures to allow program browsers, components totaling approximately 1000 lines of code were required. The client browser was implementing using a locally developed graphical toolkit. A fully functional C++ and Java browser was implemented with the core interfaced to the graphical toolkit. The necessary extension components to provide browsing support for C++ totaled approximately 3000 lines of code. Adding Java support to this code base required the addition of another 1000 lines of code.

The C++ program store which makes up the core of the server is organized as a dependency graph, in which the nodes of the dependency graph are ASTs. When a recompilation occurs, new nodes are attached to the dependency graph, and the changed nodes, and all nodes beneath them in the dependency graph are all compiled. In addition to the dependency graph, the system maintains a data structure corresponding to the global namespace of the entire C++ program, and containing links to each declared entity in the program.

To create a remote replicated structure that will be used for browsing, the namespace facet of this data structure is replicated, ignoring the dependency links which are useful for compilation but not for browsing. The objects which are exposed to the client therefore are the namespace containing a list of the top-level declarations, and the ASTs corresponding to declarations themselves. The distinguished id "0" is assigned to the top-level namespace object itself, so that the list of top-level declarations can be used to bootstrap the replication process.

Given this set of objects which can be exposed to the client, a set of queries need be developed which could be used to make all of the necessary data available to the client. The system needed a set of six queries described below:

1. Declarations. Given an object which contains nested declarations, return a document containing a list of the names, ids, and declaration types of all of the nested declarations. Otherwise, return null.

2. Type Descriptor. Generate the type descriptor of an object. If the object does not have a type descriptor, return null.

3. Body. Given the ID of a declaration, generate the AST for the declaration body associated with the object. If no declaration body is available, return null.

Each of these queries generates an XML document containing the encoded result of the query. The DTDs for the document types were developed in conjunction with the queries themselves. On the client side, a system was built that allows these XML documents to be lazily parsed into data structures that closely mirror the subsets of the functionality of the corresponding C++ datatypes that is useful for program browsing.

The codestore has relatively few events that trigger state changes. The codestore only changes when a recompilation is performed and, due the incremental nature of the system, recompilation only changes the ASTs corresponding to the specific program elements that changed, and their dependents. Therefore, for the code browser, the only server-side state change that was needed was the invalidation of changed program store elements after recompilation. Some experimentation showed that the performance of the sample system was fast enough so that issuing individual invalidation events for each changed data structure was not justified. Therefore, implementation of a single "Project.Invalidate" event which invalidates the entire client replica of the program store was sufficient.

Besides this basic state change, a family of events must be provided to handle user interface actions, and their results. In our interface, there are three events that require the server to take some actions: loading a new project, closing the current project, and triggering a compilation.

To load a new project, the client prompts the user with a dialog that allows them to select a project file. The client generates a "ProjectLoad" event to notify the server that a project was selected. This event contains the name of the selected project in its detail string. The server attempts to load the project in its detail string. The server attempts to load the project, and issues a "Prokect.Load.Success" event with a null detail structure if successful; otherwise, it generates a "Project.Load.Failure" event with information about the error in the detail string and/or document.

When the user closes the project being browser, the client issues a "Project.Close" event to notify the server to close the project. The server does not need to generate any event in response to this, since the close action always succeeds.

Finally, when the user triggers a recompilation, the client issues a "Project.Compile" event. On receipt of this event, the server starts to recompile the project. If it succeeds with no errors, it generates a "Project.Compile.Success" event. On receipt of this event, the client invalidates its local data cache, and initiates a retrieval of the top-level declaration store. If the compilation failed, the server generates a sequence "Project.Compile.Error" events that describe the compilation errors. The target of each event is the ID of the declaration or source file which contained the error, and the detail string and document contain information describing the error.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. For example, the invention is applicable to any program.

It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for generating heterogeneous data structures using at least one processor and a plurality of parsers, each parser for parsing a particular structured document type, and a registry for associating each of said parsers with a corresponding document type, the method comprising:
    having a first program and a second program, said first program having a set of structured data in a first data structure executable on only by said first program;
    sending a first document of a first document type including data from said first data structure to said second program; and
    employing dynamic parsing to parse said data from said first data structure of said first document into a second data structure for execution by the second program by applying an asynchronous subscription based event notification for rendering said second data structure.

2. The method as in claim 1, where the step of sending includes obtaining a request and responding to said request.

3. The method as in claim 1, where the step of parsing is performed by the second program.

4. The method as in claim 1 further comprising steps of:
    receiving information indicating a change in one of the first and the second data structures to a third data structure; and
    modifying the other of the first and the second data structure into a fourth data structure in correspondence with said third data structure by applying an asynchronous subscription based event notification for rendering said fourth data structure.

5. The method as in claim 4, wherein the step of receiving information includes the first program sending the information.

6. A computer-implemented method of creating replicas in a computing environment comprising at least a first and a second processing machine, the method comprising:
    moving data from a first machine to a second machine to form said replica, wherein said forming a replica comprises moving only a portion of said data to the second machine; and
    communicating an updating event on the first machine to the second machine to keep the data consistent, said updating event being associated with said data and comprising an asynchronous subscription based event notification for updating said data.

7. The method as recited in claim 6, wherein said data is in a first form on said first machine, and said replica is transformed into a second form on said second machine.

8. The method as recited in claim 6, further comprising communicating an updating event on the second machine to the first machine to keep the data consistent.

9. The method as recited in claim 6, wherein the step of moving includes responding to at least one query.

10. A computing system for providing replicated data structures comprising:
    a server comprising an event management component having at least one event handler, a query management component having at least one query handler and at least one server database location for storing server data; and
    at least one client comprising a query generator, an event management component having at least one event handler, a user interface, and a dynamic parsing component with at least one parser extension for accessing said server data and for applying an asynchronous subscription based event notification whereby arbitrary data structures are rendered into a standard communication format by dynamically parsing said data from a first data structure executable by a first program into a second data structure for execution by a second program by applying the contents of the asynchronous subscription based event notification for rendering said second data structure.

* * * * *